United States Patent
Herman et al.

(10) Patent No.: US 11,072,963 B2
(45) Date of Patent: Jul. 27, 2021

(54) INTERIOR AREA TEMPERATURE MODULATING METHOD AND TEMPERATURE MODULATING ASSEMBLY

(71) Applicant: Ford Global Technologies, LLC, Dearborn, MI (US)

(72) Inventors: David Michael Herman, Oak Park, MI (US); Nunzio DeCia, Northville, MI (US); Stephen Jay Orris, Jr., New Boston, MI (US); Nicholas Alexander Scheufler, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 16/177,502

(22) Filed: Nov. 1, 2018

(65) Prior Publication Data
US 2020/0141174 A1    May 7, 2020

(51) Int. Cl.
*E05F 15/71* (2015.01)
*B60L 53/30* (2019.01)
*B60L 58/24* (2019.01)

(52) U.S. Cl.
CPC .............. *E05F 15/71* (2015.01); *B60L 53/30* (2019.02); *B60L 58/24* (2019.02); *B60L 2240/36* (2013.01); *E05Y 2900/106* (2013.01)

(58) Field of Classification Search
CPC ....... E05F 15/71; E05F 15/70; B60L 2240/36; B60L 58/24; B60L 53/30; E05Y 2900/106
(Continued)

(56) References Cited

U.S. PATENT DOCUMENTS

| 5,752,343 A * | 5/1998 | Quintus ................. E05F 15/79 49/29 |
| 8,643,467 B2 * | 2/2014 | Chutorash ............... E05F 15/72 340/5.71 |

(Continued)

FOREIGN PATENT DOCUMENTS

| CN | 205805062 | 12/2016 |
| CN | 106320761 | 1/2017 |
| JP | 2014090526 | 5/2014 |

OTHER PUBLICATIONS

Tesla Motor Club, Charring in an enclosed garage, Jul. 9, 2012, https://teslamotorsclub.com/tmc/threads/charging-in-an-enclosed-garage.8834/ (Year: 2012).*

(Continued)

*Primary Examiner* — Kenneth J Hansen
*Assistant Examiner* — Dana K Tighe
(74) *Attorney, Agent, or Firm* — David Kelley, Esq.; Carlson, Gaskey & Olds, P.C.

(57) ABSTRACT

A method to transfer thermal energy from an interior area includes, among other things, automatically transmitting a request to open a door to provide an opening from the interior area. The opening permits thermal energy to move from the interior area to an exterior area. At least some of the thermal energy within the interior area is generated when charging a vehicle within the interior area. An assembly includes, among other things, a door actuation module that automatically transmits a request to open a door to provide an opening from an interior area. The opening permits thermal energy to move from the interior area to an exterior area. At least some of the thermal energy within the interior area is generated when charging a vehicle within the interior area.

12 Claims, 5 Drawing Sheets

(58) Field of Classification Search
USPC .......................................................... 454/195
See application file for complete search history.

(56) References Cited

U.S. PATENT DOCUMENTS

| | | | |
|---|---|---|---|
| 8,725,338 | B2 | 5/2014 | Tanaka |
| 8,872,379 | B2 | 10/2014 | Ruiz et al. |
| 9,020,671 | B2 | 4/2015 | Lindemann et al. |
| 9,467,002 | B2 | 10/2016 | Martin et al. |
| 2006/0220834 | A1* | 10/2006 | Maeng ................ G08B 25/007 340/539.1 |
| 2007/0182574 | A1* | 8/2007 | Dzurko ................ G08B 21/16 340/632 |
| 2009/0124189 | A1* | 5/2009 | Barber ................ F24F 11/0001 454/258 |
| 2013/0106195 | A1* | 5/2013 | Kusch ................ H02J 7/1423 307/82 |
| 2013/0321127 | A1* | 12/2013 | Wilder ................ E05D 15/242 340/5.71 |
| 2017/0114585 | A1* | 4/2017 | Ozkan ................ F02D 41/042 |

OTHER PUBLICATIONS

EV Infrastructure Installation Guide, Section 3, Feb. 5, 2010, https://web.archive.Org/web/20100205091111/https://www.pge.com/includes/docs/pdfs/about/environment/pge/electricvehicles/ev5pt3.pdf) (Year: 2010).*

Holt, Mike, EV Charging Systems, Electrical Construction & Maintenance Magazine, Sep. 18, 2013, pp. 1-13, retrieved from https://www.ecmweb.com/codebasics/evchargingsystems on Aug. 21, 2018.

Campolo, Claudia, Antonella Molinaro, and Antonio Iera, A Reference Framework for Social-enhances Vehicle-to-Everything Communications in 5G Scenarios, Computer Networks Journal, Jul. 2018.

* cited by examiner

INTERIOR AREA TEMPERATURE MODULATING METHOD AND TEMPERATURE MODULATING ASSEMBLY

TECHNICAL FIELD

This disclosure relates to automatically moving a door to provide an opening from an interior area. Charging a vehicle within the interior area can generate thermal energy. The opening permits thermal energy to move from the interior area thereby modulating a temperature of the interior area.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source. Thermal energy can be generated when charging the vehicle. If the vehicle is charging within an interior area, such as a garage of a home, the thermal energy due to charging can increase a temperature of the interior area. This may undesirably increase loads on, for example, a climate control system associated with a living area of the home.

SUMMARY

A method to transfer thermal energy from an interior area according to an exemplary aspect of the present disclosure includes, among other things, automatically transmitting a request to open a door to provide an opening from the interior area. The opening permits thermal energy to move from the interior area to an exterior area. At least some of the thermal energy within the interior area is generated when charging a vehicle within the interior area.

A further non-limiting embodiment of the foregoing method includes transmitting the request from a door actuation module of the vehicle.

A further non-limiting embodiment of any of the foregoing methods includes transmitting the request from a door actuation module that is outside the vehicle.

A further non-limiting embodiment of any of the foregoing methods includes, in response to the request, receiving an authorization from a user device. The authorization authorizing the opening of the door in response to the request.

In a further non-limiting embodiment of any of the foregoing methods, the request includes a requested opening amount for the door. The requested opening amount is larger when transferring more thermal energy is required. The requested opening amount smaller when transferring less thermal energy is required.

A further non-limiting embodiment of any of the foregoing methods includes automatically transmitting the request when a temperature of the interior area is greater than a temperature of the exterior area, but not when the temperature of the interior area is less than the temperature of the exterior area.

A further non-limiting embodiment of any of the foregoing methods includes, in response to the amount of thermal energy within the interior area, automatically transmitting a request to move the door to reduce a size of the opening.

A further non-limiting embodiment of any of the foregoing methods includes, in response to completing a charging of the vehicle, automatically transmitting a request to move the door to reduce a size of the opening.

A further non-limiting embodiment of any of the foregoing methods includes, detecting a change in the exterior area, and automatically transmitting a request to move the door to reduce a size of the opening in response to the change.

In a further non-limiting embodiment of any of the foregoing methods, the change is a presence of an individual.

In a further non-limiting embodiment of any of the foregoing methods, the door is a garage door, and the interior area is a garage.

In a further non-limiting embodiment of any of the foregoing methods, the garage door can move between a fully open position and a fully closed position, and the request is to open the garage door an amount that is between the fully open position and the fully closed position.

An assembly according to another exemplary aspect of the present disclosure includes, among other things, a door actuation module that automatically transmits a request to open a door to provide an opening from an interior area. The opening permits thermal energy to move from the interior area to an exterior area. At least some of the thermal energy within the interior area is generated when charging a vehicle within the interior area.

A further non-limiting embodiment of the foregoing assembly includes the door actuation module as part of the vehicle.

A further non-limiting embodiment of any of the foregoing assemblies includes the door. The door opens in response to the request.

A further non-limiting embodiment of any of the foregoing assemblies includes the door and a user device. The door opens in response to the request and request when authorized by the user device.

A further non-limiting embodiment of any of the foregoing assemblies includes a thermal energy sensor in communication with the door actuation module. The thermal energy sensor is to monitor the amount of thermal energy within the interior area.

In a further non-limiting embodiment of any of the foregoing assemblies, the door actuation module, in response to the amount of thermal energy within the interior area, automatically transmits a request to move the door to reduce a size of the opening.

A further non-limiting embodiment of any of the foregoing assemblies includes a door actuator that opens the door in response to the request from the door actuation module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to modulating a temperature of an interior area by opening a door to the interior area. A request to open the door can be transmitted automatically. Opening the door provides an opening that permits thermal energy to move from the interior area. At least some of the thermal energy within the interior area is generated when charging a vehicle. Moving thermal energy from the interior area can prevent a temperature of the interior area from reaching an undesirable level, such as a level that would overly burden an air conditioning system that cools an area near the interior area.

Figure 1:
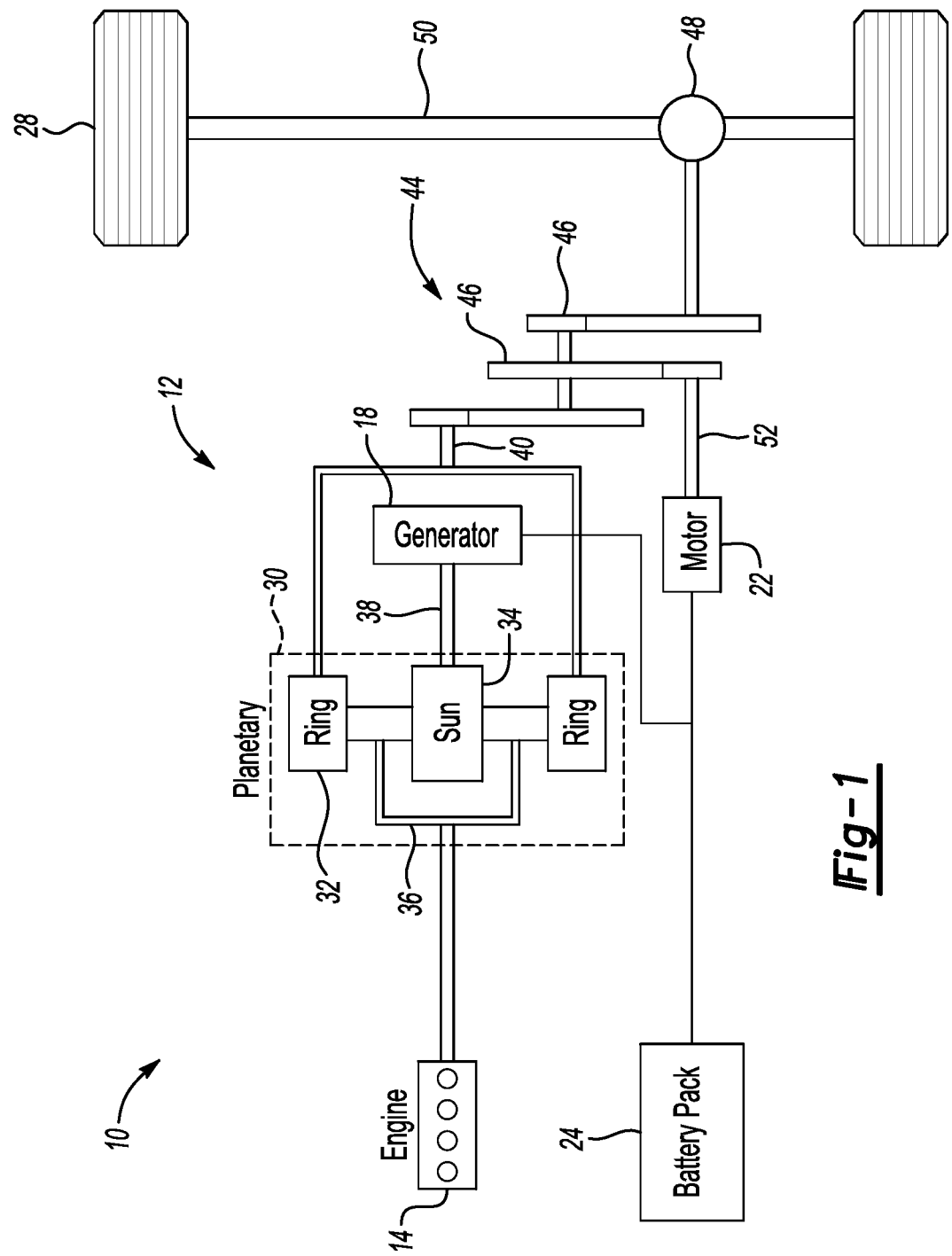
FIG. 1 illustrates a schematic view of a powertrain of an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to propel the wheels 28.

Figure 2:
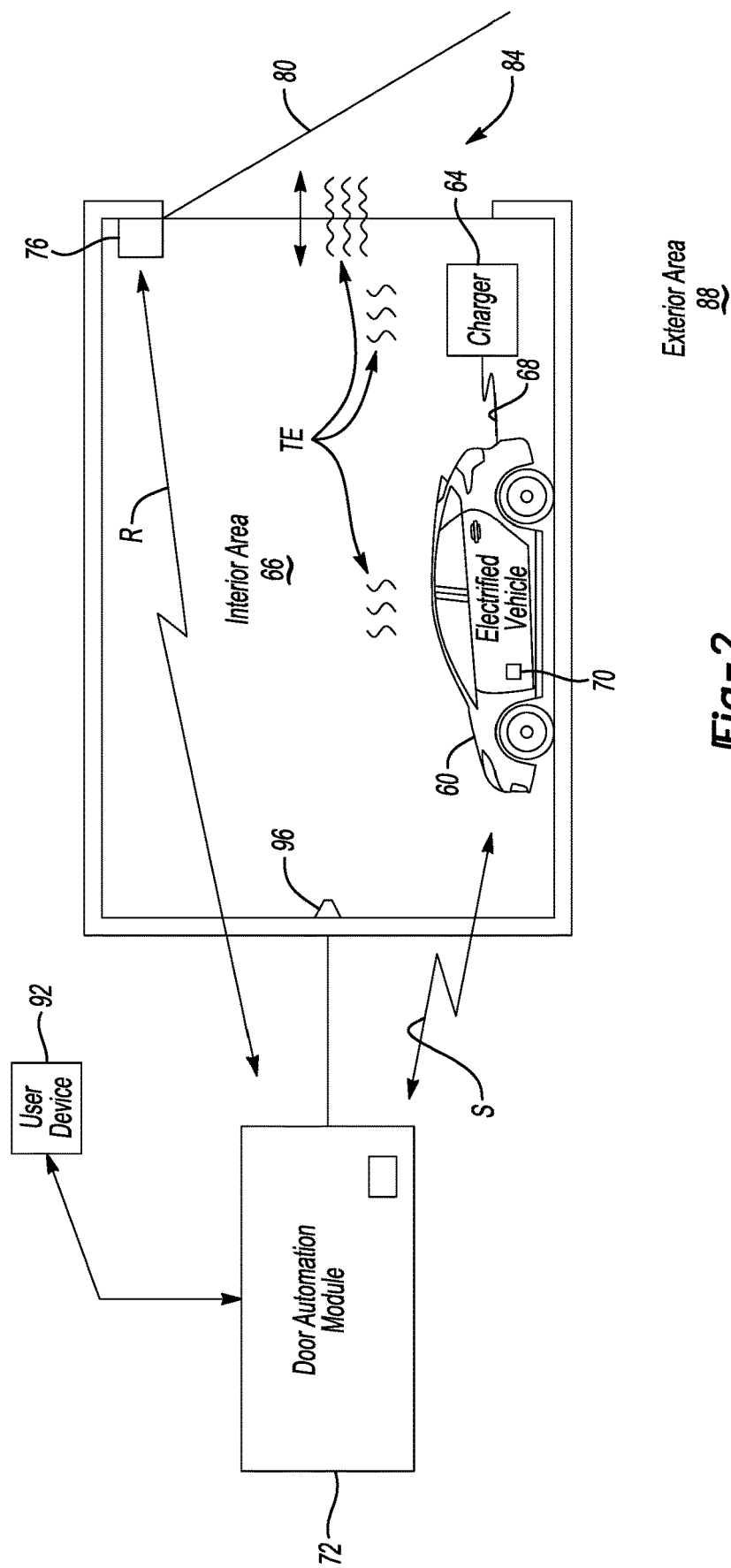
FIG. 2 illustrates a schematic view of a door actuation module and an interior area having a door that can open to provide an opening to the interior area.

With reference now to FIG. 2 and continuing reference to FIG. 1, an electrified vehicle 60 incorporates the powertrain 10 in an exemplary, non-limiting embodiment. An external power source, such as a charger 64, can be used to charge the battery pack 24.

The charger 64 of the exemplary embodiment is charging the battery pack 24 of the electrified vehicle 60 when the electrified vehicle 60 is within an interior area 66, such a garage. A wired charging connector 68 electrically couples the electrified vehicle 60 to the charger 64 in this example. Other examples could wirelessly charge the electrified vehicle 60 from the charger 64.

Charging the electrified vehicle 60 can generate thermal energy TE. Components, such as AC to DC conversion elements or other elements of the connector 68, charger 64, and electrified vehicle 60, can release thermal energy TE during charging. The thermal energy TE can come from the electrified vehicle 60 (e.g., the battery pack 24), the charger 64 and the wired charging connector 68. In some examples, ten to twenty percent of the energy used to charge the vehicle 60 is released as thermal energy TE when charging the vehicle 60 using the wired charging connector 68. Wireless charging can release even more thermal energy TE than charging using the wired charging connector 68.

The electrified vehicle 60 includes a communication module 70 that permits the electrified vehicle 60 and a door actuation module 72 to communicate with each other. The communications between the electrified vehicle 60 and the door actuation module 72 could be part of a vehicle-based wireless control system, such as HomeLink® by Gentex Corporation, or a Bluetooth, Wi-Fi, Visible Light Communication (VLC), cellular modem communication system.

The door actuation module 72 can additionally communicate with a door actuator 76. The communications between the door actuation module 72 and the door actuator 76 could be wired, wireless, or some combination of these. The door actuation module 72 and the door actuator 76 can, in some examples, be combined into a single door opening assembly.

The door actuator 76 can open and close a door 80 to the interior area 66. The door actuator 76 can cause the door 80 to transition to a fully open position, a fully closed position, or a position in between the fully open and fully closed position as is shown in FIG. 2. Generally, the door 80 is any type of structure that can move to provide the opening 84.

To modulate a temperature within the interior area 66, the door actuation module 72 can transmit a request R to the door actuator 76. In response to the request R, the door actuator 76 moves the door to the position of FIG. 2, which provides an opening 84.

The opening 84 permits thermal energy TE to move from the interior area 66 to an exterior area 88 that is outside the interior area 66. At least some of the thermal energy TE within the interior area 66 is generated when charging the electrified vehicle 60 within the interior area 66.

In the exemplary embodiment, the door actuation module 72 transmits the request R to the door actuator 76 in response to a signal S from the electrified vehicle 60. The signal S could indicate that the electrified vehicle 60 is charging. The signal S could instead, or additionally, indicate a temperature within the interior area 66.

In another embodiment, the door actuation module 72 transmits the request R in response to a signal from outside the electrified vehicle 60, such as a reading from a sensor 96. The reading from the sensor 96 can provide the door actuation module 72 with information about the thermal energy TE within the interior area 66, such a temperature within the interior area 66. In such an example, when the signal from the sensor 96 indicates that the temperature of the interior area 66 has risen above a threshold value, the door actuation module 72 transmits the request R.

Some embodiments may not require the sensor 96. Such embodiments could instead estimate thermal energy levels based on, for example, a charging rate at which the battery pack 24 of the electrified vehicle 60 is charged from the charger 64. The thermal energy generated at various charging rates could be modeled, and the model accessed by the door actuation module 72 to estimate thermal energy TE within the interior area 66. The model can, in some examples, rely on the real time charging rate value as an input to an algorithm that estimates thermal energy TE generated from the charging. A first thermal model could be used to estimate thermal energy TE from the electrified vehicle 60 for a given charging rate. A second thermal model could be used to estimate thermal energy TE for the charger 64 and the wired charging connector 68 for the given charging rate.

Thus, the door actuation module 72 can automatically transmit the request R in response to input from the electrified vehicle 60 indicating that, for example, the electrified vehicle 60 is charging, in response to an input from the sensor 96, or some combination of these. The request R, in such examples, can be transmitted autonomously to the door actuator 76.

The door actuator module 72 can include appropriate hardware and software for transmitting the request R, for receiving appropriate inputs, and for calculating whether or not the request R should be transmitted. The door actuator module 72 can, for example, assess and/or approximate thermal diffusion from the interior area 66 when the door 80 is closed and when the door 80 is in different open positions to provide different sizes for the opening 84 depending on how much thermal energy TE needs to move from the interior area 68.

In some examples, the door actuation module 72 may instead, or additionally, require an authorization from the user before the request R is relayed to the door actuator 76. For example, prior to the door actuation module 72 transmitting the request R to the door actuator 76, the door actuation module 72 may transmit the request R automatically to a user device 92. The user device 92 can include a human machine interface on the vehicle 60, a smart device, such as a cell phone, a wearable device worn by the user, or another type of user smart device.

For the door actuation module 72 to then transmit the request to the door actuator 76, a user input through the user device 92 can be required. The user input authorizes the door actuation module 72 to relay the request R to the door actuator 76. The door actuation module 72 could, for example, send the request R to the user device 92. The user can then, through the user device 92, authorize the door actuation module 72 to transmit the request R to the door actuator 76.

Thus, the request R can be sent autonomously to the door actuator 76 in some examples, and, in other examples, the request R must be authorized before being relayed to the door actuator 76.

In the example of FIG. 2, the door actuation module 72 is outside of the electrified vehicle 60. The door actuation module 72 could be incorporated within a communication system for a building, such as a home, associated with the interior area 66. The door actuation module 72 could be partially or fully located within the interior area 66. For example, the door actuation module 72 could be part of the charger 64.

In another example, the door actuation module 72 could be partially or fully incorporated into the electrified vehicle 60, such that the request R can be sent to the door actuator 76 without passing through any portion of the communication system for the building. The door actuation module 72, when incorporated within the electrified vehicle 60, could transmit requests based on information from the sensor 96, based on the charging status of the electrified vehicle 60, or both of these. The door actuation module 72 could further, when incorporated within the electrified vehicle 60, require a user to authorize the transmission of the request R to the door actuator 76.

In some examples, the request R includes a requested opening amount for the door 80. When moving more thermal energy TE through the opening 84 is required, the requested opening amount is larger so that the opening 84 is larger. When transferring less thermal energy TE through the opening 84 is required, the requested opening amount is smaller so that opening 84 is smaller.

In some examples, the door 80 may be controlled by the door actuation module 72 instead, or additionally, to address potential safety issues. The door actuation module 72 could, for example, constrain the door 80 to open no more than set amount. This could prevent the door 80 moving to a position where the opening 84 is large enough for an unauthorized individual to enter the interior area 66.

In some examples, the vehicle 60 can utilize sensors (e.g., rear backup camera) to monitor the opening 84 and the surrounding area. In response to a presence of an individual, such as an individual approaching the opening 84 from the exterior area 88, the door actuation module 72 may transmit a command to the door actuator 76 causing the door actuator 76 to close the door 80.

The sensors could be mounted outside the vehicle, such as sensors that monitor the opening 84 and its surrounding areas. The other sensors could be home security cameras, for example. In still other examples, the sensors could be If This, Then That (IFTTT) sensors or similar smart home sensors that are leveraged accordingly. For example, if a driveway camera sensor detects motion, the door actuation module 72 could transition to a security mode where the door actuation module 72 commands the door actuator 76 to close the door 80.

The door actuation module 72 could also, or instead, open the door 80 at random intervals to permit thermal energy TE to move from the interior area 66. The random intervals may frustrate an individual attempting to learn a pattern associated with the opening of the door 80.

The door actuation module 72 could alter a charging plan for the vehicle 60 to, for example, lengthen a duration that the vehicle 60 is charged to reduce an amount of thermal energy TE within the interior area 66 due to the charge. A longer period of charging generates a lower peak of thermal energy TE than a shorter period of charging, which could facilitate maintaining the interior area 66 at a desired temperature while maintaining the opening 84 at the desired size.

The charging plan could include lengthening the charging duration, while still planning to complete charging of the vehicle 60 at a specified preset time or based on a predicted utilization of the vehicle 60 given historical trip data.

Figure 3:
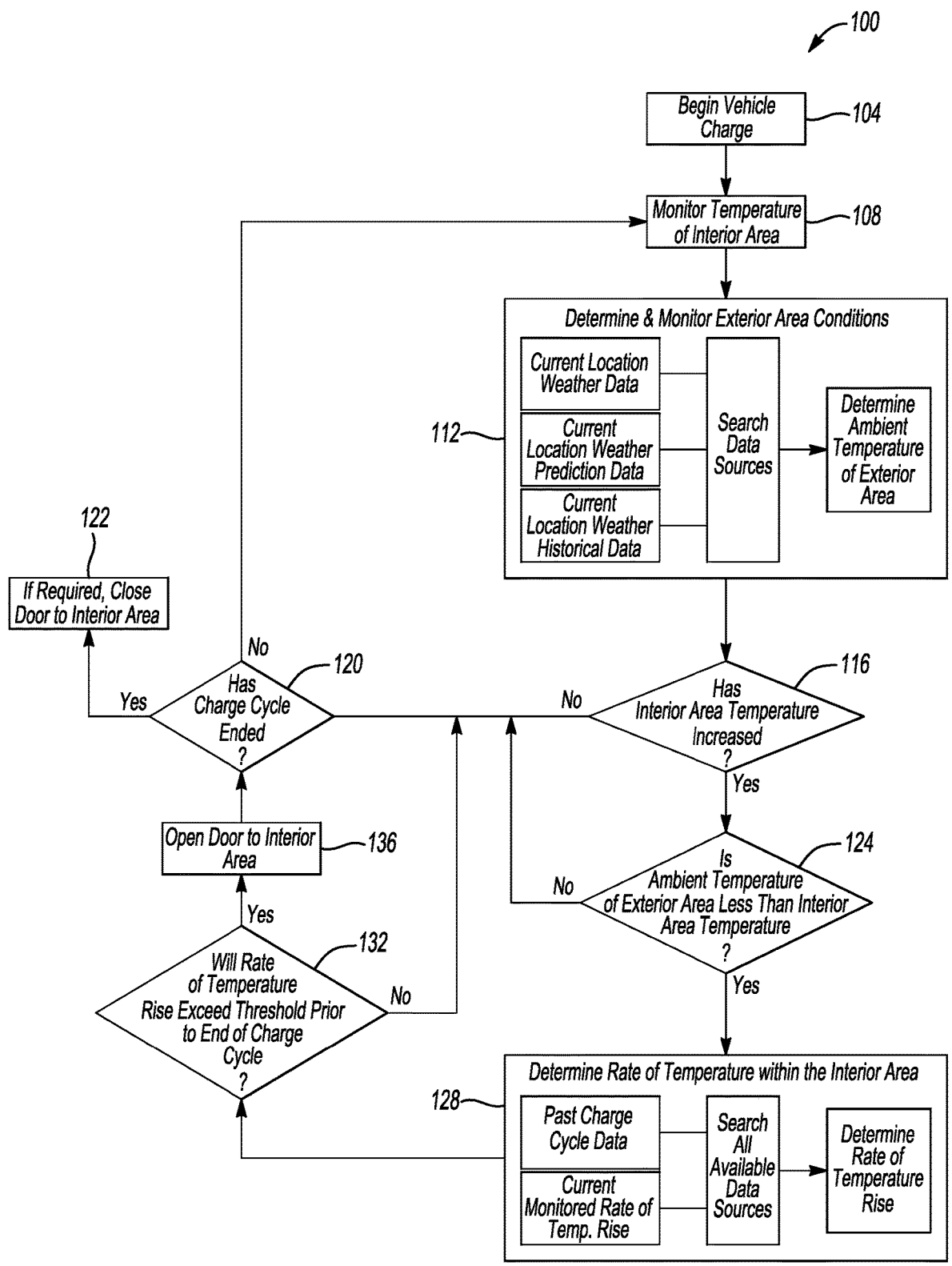
FIG. 3 illustrates a flow of an example method utilized by the door actuation module of FIG. 2.

With reference now to FIG. 3 and continued reference to FIG. 2, the door actuation module 72 can operate according to various methods. A flow of an example method 100 to transfer thermal energy TE from the interior area 66 begins at a step 104 where the vehicle 60 begins a charge within the interior area 66.

Next, at a step 108, the method 100 monitors conditions of the interior area 66. For example, the step 108 could include monitoring a temperature of the interior area using the sensor 96.

At a step 112, the method 100 monitors conditions of the exterior area 88. The monitored conditions of the exterior area 88 can include current weather data, predicted weather data, historical weather data, or some combination of these. Various sources may be used to provide the condition information, including cloud-based databases updated by weather services. The step 112 can, in some examples, determine an ambient temperature of the exterior area 88, and a predicted ambient temperature of the exterior area 88 at some point in the future. In some examples, the vehicle 60, the door actuation module, or both store a log of temperatures of the exterior area 88. Average temperature values for an appropriate time of year and time of day could also be obtained from a cloud-based weather service, for example.

Next, at a step 116, the method 100 assess whether a temperature of the interior area 66 has increased. If no, the method 100 moves to a step 120 which assesses whether a charge cycle for the vehicle 60 has ended. If no, the method 100 returns to the step 108 which continues to monitor temperature of the interior area 66.

If, at the step 120, the charge cycle has ended, the method 100 moves from the step 120 to a step 122 which, if required, transmits a command to the door actuator 76 causing the door actuator 76 to close the door 80.

Returning to the step 116, if the temperature of the interior area 66 has increased, the method 100 moves to the step 124 which, utilizing the monitored temperature of the interior area 66 from the step 108, and the ambient temperature of the exterior area 88 from the step 112, assesses whether the ambient temperature of the exterior area 88 is less than a temperature of the interior area 66. If yes, the method 100 progresses to a step 128. If no, the method 100 progresses to the step 132.

At the step 128, the method 100 determines a rate of temperature rise within the interior area 66. The rate of temperature rise can be assessed based on past charge cycle data, current monitor rate of temperature rises. Various data sources can be assessed to determine the rate of temperature rise at the step 128 within the interior area 66, including data from the sensor 96.

The door actuation module 72 can, for example, refer to measurements of past temperatures within the interior area 66 when the vehicle 60 was previously charged. The door actuation module 72 can even, in some examples, estimates a thermal mass of the interior area 66 to refine the assessment of the rate at which the temperature rises. The door actuation module 72 can then assess when a reduction in temperature is needed within the interior area 66 and, in some examples, how much of a temperature reduction is required.

At a step 132, the method 100 assesses whether the temperature rise within the interior area 66 will exceed a threshold temperature prior to the end of the charge cycle. A temperature above the threshold temperature may be a temperature representing an undesirable amount of thermal energy TE within the interior area 66.

If the temperature rise within the interior area 66 will not exceed a threshold temperature prior to the end of the charge cycle, the method 100 moves from the step 132 to the step 120.

If the temperature rise within the interior area 66 will exceed a threshold temperature prior to the end of the charge cycle at the step 132, the method 100 moves to a step 136, which transmits the request R to open the door 80.

That is, upon determining that a reduction in temperature of the interior area 66 is required, the door actuation module 72 can transmit the request to open the door 80 to the interior area 66. Opening the door 80 permits thermal energy TE to move through the opening 84 from the interior area 66 to the exterior area 88. An amount that the door 80 is opened can be varied to vary a size of the opening 84. A larger opening would permit more thermal energy TE to move from the interior area 66 to the exterior area 88 than would a smaller opening. A larger opening thereby facilitates cooling of the interior area 66 more quickly than would a smaller opening.

Figure 4:
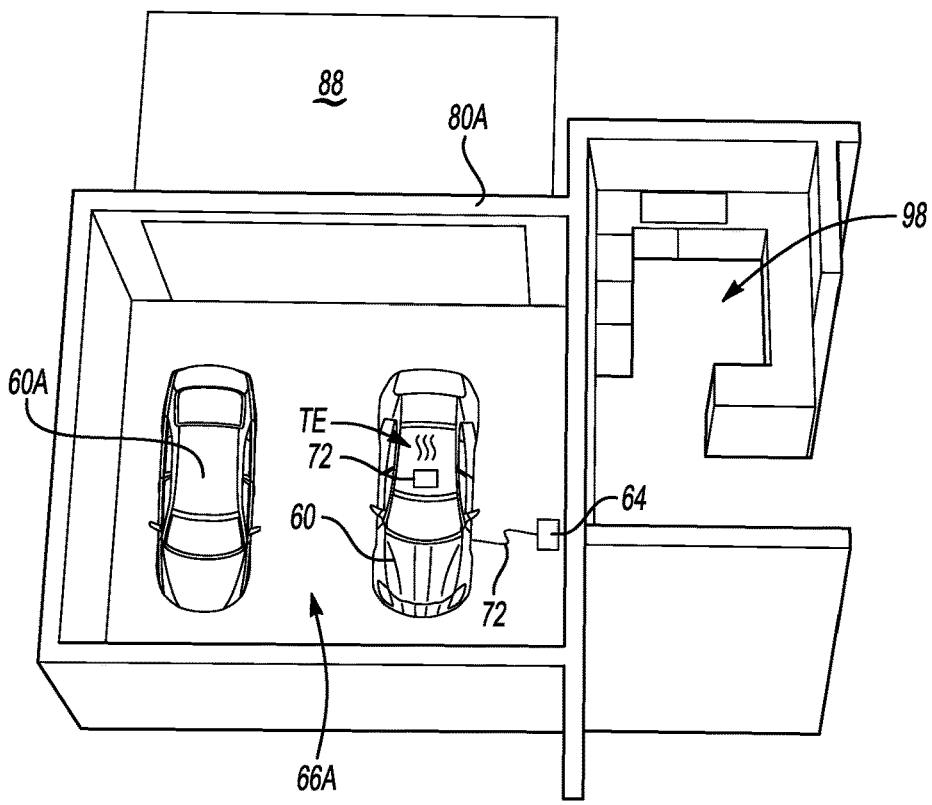
FIG. 4 illustrates a top view of a garage, which is a type of an interior area, having a door in a fully closed position.
Figure 5:
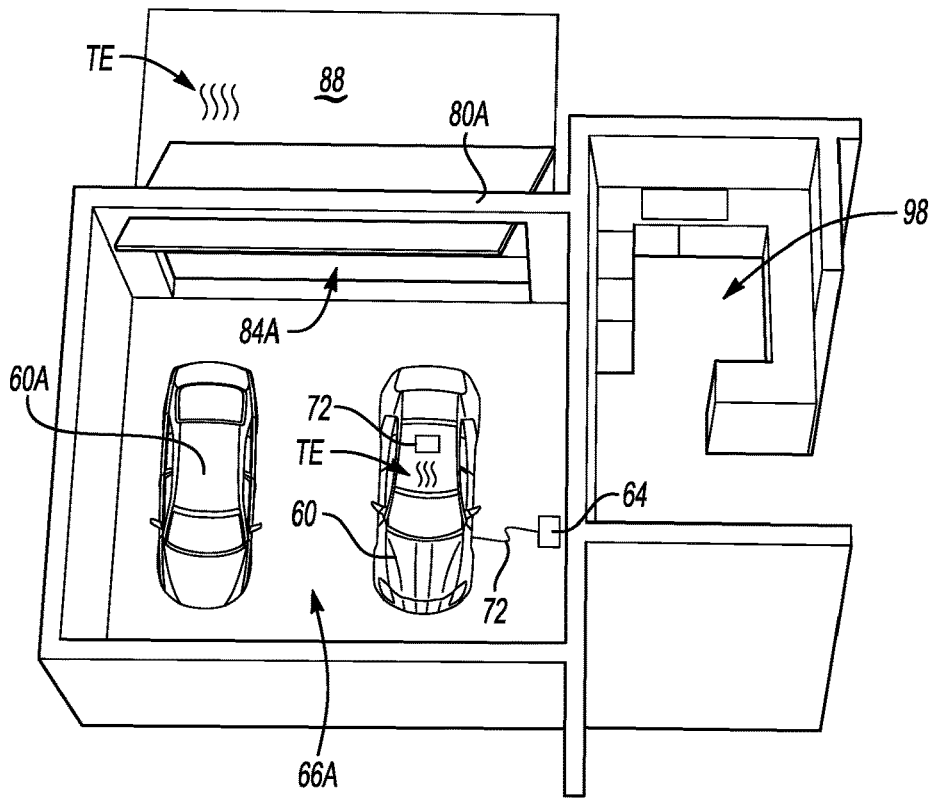
FIG. 5 illustrates the door of FIG. 4 in an open position.

With reference now to FIGS. 4 and 5 and continued reference to FIG. 2, an example of the door 80 is a garage door 80A, and example of the interior area 66 is a garage 66A. The door actuation module 72 of the FIGS. 4 and 5 embodiment can be incorporated into the vehicle 60, which is being charged within the interior area 66A. The door actuation module 72 can transmit a request to open the garage door 80A from a fully closed position (FIG. 4) to an open position (FIG. 5) according to the method of FIG. 3.

The open position of FIG. 5 is not a fully open position for the garage door 80A. That is, from the position of the garage door 80A in FIG. 5, the garage door 80A could be raised even further to provide an opening that is larger than the opening 84A in FIG. 5.

A size of the opening 84 can be adjusted by changing how high the garage door 80A is raised. In some examples, the height to which the garage door 80A is raised in response to a request from the door actuation module 72 is preprogrammed based on some prebuilt dictionary for an average garage based on some set of prior experiments and the present conditions and charging plans for the vehicle 60. If, for example, more cooling is required of the interior area 66A, the request transmitted to open the garage door 80A may cause the garage door 84A to open to a set height that is greater than a set height if less cooling were required.

In some examples, a camera of the vehicle 60 could be used to monitor a size of the opening 84A. The request R could be continually refined to change a size of the opening 84A based on a size of the opening 84A detected by the camera of the vehicle 60.

The camera of the vehicle 60 or other devices of the vehicle 60 could instead or additionally be utilized to provide a volumetric estimation of the size of the interior area 66A, which may facilitate calculating, among other things, a rate at which a temperature of the interior area 66A will increase when the charging the vehicle 60. A smaller volume garage will, for example, heat up more quickly than a larger garage. In another example, a user provides an input to the door actuation module 72 indicating the estimated volume of the garage 66A.

The door actuation module 72 could, based on past charges of the electrified vehicle 60 and associated temperatures monitored of the interior area 66A, estimate an effective thermal mass of the garage 66A and, as a result, assess thermal diffusion of the garage 66A. The estimate can provide a numerical estimation, in some examples, of how quickly a temperature of the interior area 66 will increase due to charging the vehicle 60, and a duration of that temperature rise before the thermal energy TE dissipates. The time may include a time required to equalize the temperature of the interior area 66A with a temperature of the exterior area 88 after a charge of the vehicle 60.

The door actuation module 72 could, in some examples, use a type of proportional integral derivative (PID) control that is based on information received from temperature sensors outside the vehicle 60, such as the sensor 96 of FIG. 2. The control can further be based on a desired temperature for the garage 66A, and how various sizes of the openings 84 will impact a temperature of the garage 66A.

Historical information associated with charging the vehicle 60 from the charger 64, and the associated rises in temperature, can be used to optimize settings within the door actuation module 72 to optimize performance and to understand the environment of the garage 66A (e.g., thermal mass, thermal diffusion).

Past road trip data could also be stored on the vehicle 60 and utilized to augment this this type of control. The past road trip data can include temperatures of the exterior area 88 measured by the vehicle 60, ambient lighting, detection of wind gusts from a driving dynamics controller, etc.

The door actuation module 72 can use these characteristics to facilitate the predictive capability of the door actuation module 72. Among other things, these characteristics can facilitate the ability of the door actuation module 72 predict an amount that a temperature of the garage 66A will be reduced in response to the garage door 80A opening a particular amount.

Sensors of the vehicle 60 can be utilized to differentiate between different garages, and other interior areas where the vehicle 60 is charged. The sensors on the vehicle 60 could, as previously described, also detect an opening size associated with opening the garage door 80A.

In some examples, the door actuation module 72 can be communicate and control home automation systems, such as smart electrical meters, heating venting and air conditioning (HVAC), garage exhaust fans, etc., to further improve the performance and capability of the door actuation module 72 to reduce an amount of thermal energy TE within the garage 66A.

For example, when the exterior area 88 is very cold, heat generated when charging the vehicle 60 could be used to heat a living area 98 of a home having the garage 66A. In such an example, the thermal energy TE generated during charging may be beneficial for heating the living area 98.

While the vehicle 60 could, in some examples, estimate whether the thermal energy TE generated during charging is beneficial to the living area 98, communication between the door actuation module 72 and, for example, an HVAC system of the home having the living area 98 would allow the door actuation module 72 to further assess the home temperature and the current workings of its HVAC system.

The vehicle 60 can be, in some examples, capable of communicating via, for example, V2X, with other vehicles, such as a vehicle 60A within the garage 66A. The vehicle 60 could communicate with the vehicle 60A to coordinate charging plans and control of the garage door 80A to optimize thermal energy TE levels within the interior area 66.

Figure 6A:
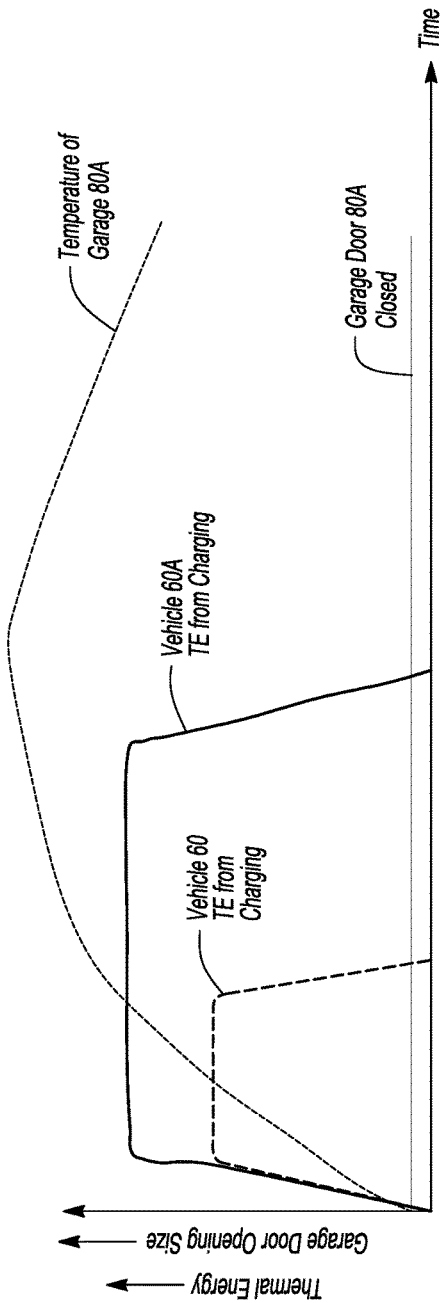
FIGS. 6A and 6B illustrate a graphical comparison of a temperature rise within the interior areas of FIGS. 4 and 5 when the garage door is closed and when the garage door is open.
Figure 6B:
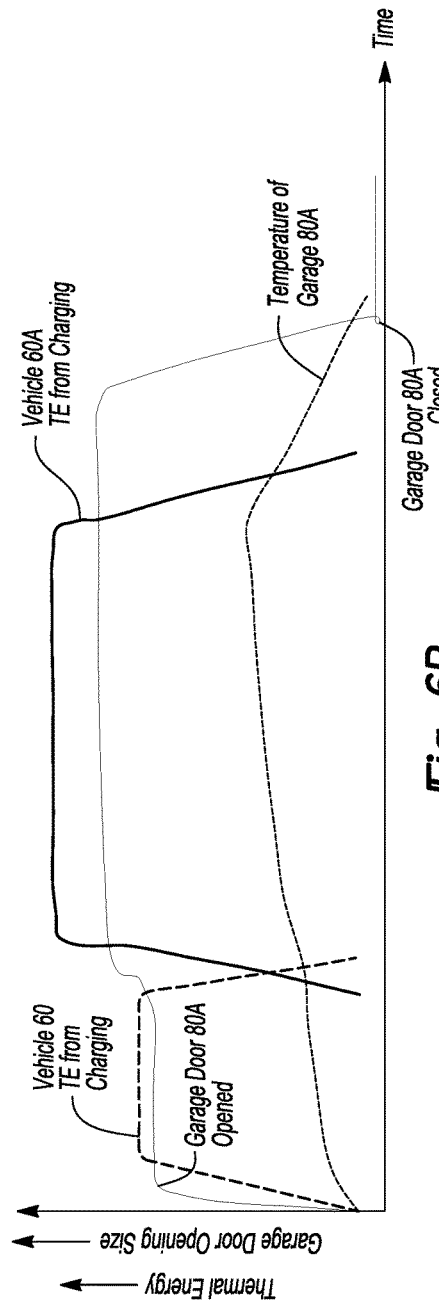

For example, with reference to FIGS. 6A and 6B, the communication between the vehicle 60 and 60A may coordinate the charging of the vehicle 60, 60A to be staggered such that the charging of the first vehicle 60 is substantially concluded when the vehicle 60A is charging. In this example, the vehicle 60 is charging via a wired charge connector, and the vehicle 60A is wirelessly charging.

During both the charging of the vehicle 60 and the vehicle 60A, the garage door 80A can be open as shown in FIG. 6B. A temperature rise within the garage 66A is less when the garage door 80A is opened and when the vehicles 60, 60A are charged substantially successively than if the vehicles 60, 60A are charged at the substantially same time.

Features of the disclosed examples include a method to predict and respond to thermal energy within an interior area where some of the thermal energy is generated when charging a vehicle. The predications can help to determine whether opening a door to the interior area would be beneficial. In an embodiment, a method coordinates a garage door, other home systems, and other co-parked vehicles within the interior area to determine an optimal coordinated charge plan and garage door opening control.

In another exemplary non-limiting embodiment, the method can control a charge plan, a garage door opening size, and an opening and closing of the garage door for security reasons via a human machine interface in the vehicle or a smart device of the users.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method, comprising:
    to transfer thermal energy from an interior area, automatically transmitting a request to open a door to provide an opening from the interior area, the opening permitting the thermal energy to move from the interior area to an exterior area, at least some of the thermal energy within the interior area generated when charging a vehicle within the interior area; and
    in response to the request, receiving an authorization from a user device that is separate from the vehicle, the authorization authorizing the opening of the door in response to the request;
    automatically transmitting the request in response to an estimate of thermal energy within the interior area, the estimate based, in part, on a charging rate at which a battery pack of the vehicle is charged from a charger, wherein the estimate is based on a first thermal model that is an estimate of thermal energy from the vehicle for a given charging rate, and a second thermal model that is an estimate of thermal energy from the charger and a wired charging connector for the given charging rate.

2. The method of claim 1, further comprising transmitting the request from a door actuation module that is outside the vehicle.

3. The method of claim 1, wherein the request includes a requested opening amount for the door, the requested opening amount larger when transferring more thermal energy is required, the requested opening amount smaller when transferring less thermal energy is required.

4. The method of claim 1, further comprising, in response to the amount of thermal energy within the interior area, automatically transmitting a request to move the door to reduce a size of the opening.

5. The method of claim 1, further comprising, in response to completing a charging of the vehicle, automatically transmitting a request to move the door to reduce a size of the opening.

6. The method of claim 1, further comprising, detecting a change in a weather condition of the exterior area, and automatically transmitting a request to move the door to reduce a size of the opening in response to the change.

7. The method of claim 1, further comprising, detecting a presence of an individual and automatically transmitting a request to move the door to reduce a size of the opening in response to the detecting.

8. The method of claim 1, wherein the door is a garage door, and the interior area is a garage.

9. The method of claim 8, wherein the garage door can move between a fully open position and a fully closed position, and the request is to open the garage door an amount that is between the fully open position and the fully closed position.

10. The method of claim 1, wherein the vehicle is an electric vehicle.

11. The method of claim 1, wherein the request is a request to open the door at random intervals.

12. The method of claim 1, further comprising transmitting the request based on a rate of temperature rise within the interior area.

* * * * *